(12) United States Patent
Belongia et al.

(10) Patent No.: US 6,596,148 B1
(45) Date of Patent: *Jul. 22, 2003

(54) REGENERATION OF PLATING BATHS AND SYSTEM THEREFORE

(75) Inventors: Brett Matthew Belongia, North Andover, MA (US); Zhen Wu Lin, Taipei (TW); John E. Pillion, Brookline, NH (US); Jieh-Hwa Shyu, Andover, MA (US)

(73) Assignee: Mykrolis Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/651,016

(22) Filed: Aug. 30, 2000

Related U.S. Application Data

(63) Continuation-in-part of application No. 09/578,388, filed on May 25, 2000, now Pat. No. 6,391,209.
(60) Provisional application No. 60/147,066, filed on Aug. 4, 1999, and provisional application No. 60/196,721, filed on Apr. 13, 2000.

(51) Int. Cl.[7] .............................. C25D 21/18; C02F 1/32
(52) U.S. Cl. ................. 205/99; 204/237; 204/DIG. 13; 205/101; 210/181; 210/195.1; 210/195.2; 210/196; 210/205; 210/209; 210/243; 210/254; 210/263; 210/650; 210/748; 210/758
(58) Field of Search ..................... 210/195.2, 198.1, 210/175, 181, 202, 205, 209, 243, 254, 263, 321.84, 639, 650, 681, 683, 685, 690, 748, 758, 759, 760, 195.1, 196; 205/99, 101; 204/237, 238, 239, DIG. 13

(56) References Cited

U.S. PATENT DOCUMENTS

| 3,267,010 A | | 8/1966 | Creatz et al. | |
|---|---|---|---|---|
| 3,920,547 A | * | 11/1975 | Garrison et al. | 210/63 |
| 4,110,776 A | | 8/1978 | Rao et al. | |
| 4,289,594 A | | 9/1981 | Alpaugh et al. | |
| 4,512,900 A | | 4/1985 | Macur et al. | |
| 4,652,352 A | * | 3/1987 | Saieva | 204/105 R |

(List continued on next page.)

FOREIGN PATENT DOCUMENTS

| DE | 42 41 867 | 6/1994 |
|---|---|---|
| DE | 195 25 509 | 1/1996 |
| DE | 198 10 859 | 9/1999 |
| WO | WO 99/19544 | 4/1999 |

OTHER PUBLICATIONS

Copy of PCT International Search Report.

*Primary Examiner*—Nam Nguyen
*Assistant Examiner*—William T. Leader
(74) *Attorney, Agent, or Firm*—Mykrolis Corporation; Timothy J. King; Paul J. Cook

(57) ABSTRACT

The present invention provides a system and method for selectively removing one or more organic and also preferably one or more inorganic contaminants from plating baths. More particularly, the invented method relates to the use of a source of energy in combination with chemical oxidants, alone or in conjunction with a catalyst to oxidize organic contaminants in the plating bath to a level such that the electroplating bath can be recovered and reused after appropriate chemical adjustment. The oxidative treatment method may be a continuous process or a batch process that is performed in a single pass and the endpoint of the oxidative process detected by a sensor. Residual organics, if desired, and chloride ions in the bath are removed from the solution by a chemisorption or physisorption treatment. Inorganic contaminants are removed from the electroplating bath by selective ion exchange resins or electrodialysis, while particulate and suspended colloidal particles are removed by filtration before the treated plating bath is recycled.

32 Claims, 8 Drawing Sheets

U.S. PATENT DOCUMENTS

| | | | |
|---|---|---|---|
| 4,724,084 A | * | 2/1988 | Pahmeier et al. ............ 210/709 |
| 4,734,175 A | | 3/1988 | Bissinger |
| 4,795,407 A | | 1/1989 | Ohsono et al. |
| 4,849,114 A | | 7/1989 | Zeff et al. |
| 5,043,080 A | | 8/1991 | Cater et al. |
| 5,091,070 A | | 2/1992 | Baner et al. |
| 5,272,091 A | | 12/1993 | Egozy et al. |
| 5,288,373 A | * | 2/1994 | Yang ........................... 204/131 |
| 5,290,439 A | | 3/1994 | Bachwald |
| 5,328,589 A | | 7/1994 | Martin |
| 5,451,323 A | * | 9/1995 | Akao et al. .................. 210/665 |
| 5,486,410 A | | 1/1996 | Groeger et al. |
| 5,523,001 A | * | 6/1996 | Foeckler, Jr. et al. ........ 210/721 |
| 5,637,231 A | * | 6/1997 | Hill et al. .................... 210/748 |
| 5,868,924 A | | 2/1999 | Nachtman et al. |
| 5,891,402 A | | 4/1999 | Sassa et al. |
| 6,162,361 A | * | 12/2000 | Adiga ......................... 210/652 |

* cited by examiner

REGENERATION OF PLATING BATHS AND SYSTEM THEREFORE

This application continuation-in-part of Ser. No. 09/578,388, filed May 25, 2000, now U.S. Pat. No. 6,391,209, Provisional Application No. 60/196,721, filed Apr. 13, 2000, and Provisional Application No. 60/147,066, filed Aug. 4, 1999.

The present invention provides a system and method for selectively removing organic and inorganic contaminants from plating baths. More particularly, the invented method relates to the use of a source of energy in combination with chemical oxidants, alone or in conjunction with a catalyst to oxidize one or more organic contaminants in the plating bath to a level such that the electroplating bath can be recovered and reused after appropriate chemical adjustment.

BACKGROUND OF THE INVENTION

Plating baths are used to plate thin metal films onto electrical components such as circuit boards and semiconductor wafers. Typical metals used in plating baths include copper, nickel, silver and tin. In semiconductor wafer manufacturing, the formation of consistent high quality thin films of copper is essential to the operation of high-speed microprocessors and memory devices. Copper films in semiconductor devices require electrical resistivity near 1.7 ohm-cm and film thickness near 1 micron. Typical copper plating solutions used for semiconductor processing contain aqueous solutions of sulfuric acid, copper ions, and various organic additives: wetting agents, brighteners, organic acids such as phosphonic and sulfonic acids, and complexing agents. These organic additives are used to achieve high quality, consistent plating. See U.S. Pat. Nos. 5,328,589, 4,110,776, 3,267,010 and 3,770,598. Over time and through use in a plating process, the organic components in the bath tend to degrade or breakdown to form organic contaminants. These organic contaminants are harmful to the plating process because they result in changes in plating efficiency, plating rate, film morphology, film stress, and electrical properties of the plated metal films. Over time and through use in a plating process, the bath also accumulates inorganic contaminants that also degrade the plated metal films. The accumulation of organic and inorganic contaminants over time in a plating bath requires that the spent bath be exchanged with fresh plating solution in order to maintain the plating process. One technique to address the accumulation of contaminants in a plating bath is disclosed in WO 99/19544). In this application, a portion of the plating solution is removed and replaced with fresh plating solution. However, even with the continuous addition and removal of solution, at some point the concentration of contaminants in the bath becomes too high and the plating process is degraded. The bath is then completely removed, treated as waste, and is replaced with a new plating solution.

Replacement of a plating bath is costly to production because it is a time consuming procedure that reduces the production throughput of the plating tool. The bath replacement also generates a significant amount of liquid waste that is hazardous to the environment and must be disposed of properly. It is expensive to dispose of such hazardous wastes in a controlled landfill. Pre-treating the bath to remove the harmful components so that the majority of the spent plating bath can be discharged as waste is complicated and difficult because it requires that the metal ions must be removed or reduced to a level sufficient to conform to national and local environmental discharge laws. Removal of metal ions requires additional equipment and chemicals and can include processes such as electrowinning. Additionally, the remainder of the organic additives or their residual components needs to be removed, typically by chemical precipitation or chemical oxidation, prior to discharge. Once the metal ions and organic contaminants have been removed, the remainder of the fluid is then treated as aqueous material by a plant's wastewater facility.

It is known that various process variables effect the efficiency and rates of oxidative degradation of organic contaminants in liquids. These include the presence of copper, cobalt, and iron ions, the concentration of hydroxide ions in solution, and the presence of radical scavengers or radical initiators such as carbonate and acetate ions. The addition of thermal, acoustic, or electromagnetic radiation also effects the efficiency and rate of oxidative processes.

It is also well known that hydrogen peroxide is an effective oxidizing agent especially when combined with ultraviolet light and heat. However the use of hydrogen peroxide results in dilution of the chemical which is being treated with water which is a solvent for the hydrogen peroxide and is also a byproduct of its chemical reaction with organic materials. A current accepted practice in the printed circuit board plating industry is to add excess volumes of hydrogen peroxide to spent plating solutions and to heat the solutions in order to oxidize the organic additive present.

In addition to the process variables known, various process and apparatus have been used to treat waste plating solutions containing organic contaminants. For example, U.S. Pat. No. 4,289,594 teaches a process for reducing the concentration of dissolved copper ion and organic complexing agent in an electroless copper plating waste solution. The process includes chemically reducing the copper ion to copper metal in a first tank to a concentration of less than 8 parts per million (ppm,) and then chemically precipitating the complexing agent after transfer of the solution to a second tank. The final step of the process requires contacting the solution with ozone gas in the presence of ultraviolet light (UV) to remove the trace levels of organics additives remaining in the bath. The remaining liquid material is then sent to a typical plant waste treatment system. In this invention the reduction of copper to less than 8 ppm is required to reduce the time required for the ozone oxidation process.

In a related method, U.S. Pat. No. 4,512,900 first chemically precipitates the copper ion in a spent plating bath to a concentration of less than 8 ppm. The reduction of copper ion concentration is required to reduce the oxidation process time. Hydrogen peroxide is used in a subsequent process step to reduce up to 60% the organic complexing agent remaining in the solution. In a preferred embodiment, the hydrogen peroxide is added to the solution following a chemical precipitation of the complexing agent and prior to treatment of the solution with ozone. The amount of hydrogen peroxide needed for this step is determined using an off-line organic carbon analyzer. The hydrogen peroxide can be combined with ultraviolet light and or heat up to a temperature of 90° C. and is used to rapidly reduce the remaining complexing agent concentration as compared to ozone and ultraviolet oxidation alone. In a final process step, the solution is pH adjusted to between 4 and 6 with sulfuric acid, and then ozone gas in the presence of ultraviolet light is sparged through the solution to further reduce the organic concentration, Thereafter, the remaining liquid material is conveyed to the plant waste processing system for disposal. The process is described as being faster than the use of ozone with ultraviolet light alone or the use of hydrogen peroxide alone.

The practice of using hydrogen peroxide in conjunction with ozone and UV light to oxidize and reduce the concentration of toxic organic compounds in copper ion free water has been disclosed in U.S. Pat. Nos. 4,849,114 and 4,792, 407. U.S. Pat. No. 5,562,822 discloses the generation of hydroxyl radicals using ultraviolet light and ozone gas in the fluid and use of the hydroxyl radicals generated in removing contaminants from waste fluid streams.

U.S. Pat. No. 5,290,439 discloses an apparatus and use of an ultraviolet radiation device for purifying a flow of liquid. U.S. Pat. No. 5,043,080 discloses use of medium pressure polychromatic mercury arc lamps for treatment of contaminated ground waters.

All of the processes detailed above require the reduction of copper ion in the waste from the electroless plating bath before treatment to remove organic contaminants. This requires the use of additional chemicals for the metal ion precipitation reaction as well as multiple tanks for the different reactions. This adds complexity and cost to the processes and the loss of valuable chemical reagents, which cannot be reused after treatment. In those processes where hydrogen peroxide is used there occurs a dilution of the treated liquid because of the addition of water in hydrogen peroxide, usually 70% or more by volume, along with water generated from the oxidation reaction process.

There is a need in the art for a method and system to reduce plating waste and to simplify the treatment of spent chemical plating solutions. The ability to reuse plating solutions after suitable treatment by process and system, preferably an in-line treatment process and system, would reduce chemical waste as well as reduce the time and cost of replacing spent plating solution with new solutions. A method and system that simplifies the use of hydrogen peroxide as an oxidant and minimizes the effect of dilution caused by water addition to the liquid to be treated is also needed. Because spent plating baths vary in the amount of contaminants that they contain; there is also a need to be able to detect and treat solutions containing different concentrations of contaminants and to indicate when such treatment processes have been completed.

The present invention provides a system and method for removing one or more organic contaminants from a liquid plating solution. In direct contrast to the prior art, the present invention substantially maintains the copper ion concentration in the solution. Additionally, the treatment of the waste plating liquid in the present invention is reduced to a single step by combining the oxidants along with external energy sources. The destruction of one or more organic contaminants in the plating solution is accomplished using sources of energy in combination with chemical oxidants. The present invention also minimizes the dilution of the liquid plating solution by liquid chemical oxidants by providing a controlled flow of gas into the liquid so as to control the evaporation of solvent and to remove volatile acid halides from the liquid during the treatment process. The present invention removes the one or more organic contaminants from the plating solution in a single pass process, and using suitable sensors indicates the end of the treatment process. The invention recycles the treated fluid for reuse rather than disposing of the fluid or trying to recover the complexing agent (cf. U.S. Pat. Nos. 5,091,070 and 4,734,175). Strategies for the removal of oxidants to prevent their release back into the process solution and the removal of chloride ions along with the degraded carbon products is addressed (described below). In addition, the current invention provides for metal ion and particle removal before the electroplating solution is returned to the system.

SUMMARY AND OBJECTS OF THE INVENTION

The present invention provides a system and process for recycling a spent plating bath by removing one or more organic contaminants through treatment of the liquid with a combination of chemical oxidants and sources of energy. The one or more organic contaminants are contacted with the oxidants and source of energy for a time sufficient to chemically degrade them to carbon dioxide, oxidized organic products, and other gases, which can readily be removed from the liquid. During the oxidation treatment the liquid is sparged with an oxidizing gas to further oxidize the liquid, to strip the liquid of one or more volatile organic compounds or acid halides, and to maintain the concentration of the solution by evaporation of liquid. Gas to liquid transfer is performed in such a manner as to maximize the gas and liquid contact area and control both the oxidation chemical reaction rate as well as the evaporation rate of the liquid. The state of the oxidation process is monitored by one or more sensor devices. The sensor is used to determine the completion of the oxidation process and elimination of the one or more organic contaminants from the solution below a threshold concentration. The remaining oxidant and thermal energy are removed and either captured or recycled. Additionally, one may pretreat the liquid containing the one or more organic contaminant by a filter, such as a carbon filter, a microporous or ultraporous filter or an oil mop. Adsorption of the one or more organic contaminants selected for removal by the media will reduce the level of one or more organic contaminant in the solution that needs to be removed by the oxidation system and thereby reduce the demand on the oxidation system. Following the oxidation treatment, the oxidized organic(s) and dissolved chloride ions are then removed via a carbon filter or other media.

Optionally, the chemical oxidant and source of energy may be coupled with a photocatalyst, typically a metal such as titanium, platinum, palladium, zirconium or their oxides to increase the rate of organic contaminant oxidation. The oxidation process is monitored in real time and indicates the completion of the oxidation process. After oxidation of the one or more organic contaminants, the residual oxidant, oxidized organic(s), and chloride are removed from the fluid.

Following the removal of the organic contaminant(s) from the spent plating solution, the organic contaminant(s) free solution may optionally be sent through a metal impurity removal stage where undesired metal ions such as iron, introduced through the dissolution of the copper anode or the introduction of additives are removed. Ions such as iron have a deleterious effect on performance of the plating process. The solution is sent through a filter to remove particles which may have been introduced into the plating bath or which may have precipitated during treatment. The purified copper solution is then replenished with solvent, additives and copper ions to achieve the original makeup of the solution, which is reintroduced to the plating process.

It is an object of the present invention to provide a system for the removal of one or more organic compounds from spent electroplating baths. The present invention is comprised of a conduit for passing the spent bath, an oxidation unit containing a source of energy and chemical, a chemical concentration sensor, and a device for removing or breaking down leftover oxidants. The energy source and chemical oxidants are directed to the solution as it passes through the oxidation unit in order to break down the one or more selected organics for removal into carbon dioxide and oxidized species. The concentration of the solution is controlled by the flow of an oxidant gas through the solution so as to effect evaporation of the liquid solvent in the plating bath during the chemical oxidation process. This flow of gas through the solution also effects the removal of volatile acid halides from the solution. The treated solution passes through a chemical monitoring unit that indicates the concentration of one or more organic materials following the oxidation treatment. Thermal energy is removed from the treated solution and then it is then passed over an adsorptive material for removing the oxidized species before being recycled back to the electroplating process.

It is another objective of the present invention to provide a method of removing chloride ions that are present in the electroplating bath. Chloride ions are removed simultaneously with oxidized species when the solution is passed over or through an adsorptive material.

It is another object of the present invention to provide a method of removing one or more organic contaminants present in an electroplating bath to a level below a predetermined threshold from about 1 to 99.99 percent concentration, preferably from 60 to 99.99 percent concentration by passing the spent solution through a conduit and exposing the bath to a source of energy in the presence of chemical oxidants while in the conduit. Typically organic contaminants are present in the plating solution from 20 to 20,000 parts per million by volume.

It is a further object to provide a system for the removal of one or more organic compounds from a spent electroplating bath comprising a conduit for passing the spent bath, said conduit containing a source of energy and a catalyst as well as a chemical oxidant introduction port all of which are in the path of the bath as it passes through the conduit in order to break down the one or more selected organics into oxidized components, an oxidant and thermal energy recapture device downstream of the conduit, a chemical concentration monitoring device for measuring the completion of the oxidation step, and an absorptive bed for removing the carbon dioxide and/or oxidized species from the bath.

It is another objective of the present invention to remove one or more inorganic impurities, such as iron, sodium and potassium, or other non-copper metal ion impurities, from the spent electroplating solution. It is a further objective of this invention to remove one or more anionic impurities such as nitrates, phosphites, carbonates, acetates, formates, and phosphates from the spent plating solution. This removal of one or more ions is accomplished by passing the organic contaminant(s) free solution through an ion specific adsorptive bed or other ion specific removal process for example, electrodialysis, before returning the solution to the electroplating process.

It is a further objective of the present invention to remove colloidal contaminants before the solution is sent back to the electroplating process.

It is another objective of the present invention to adjust the chemistry of the recovered electroplating solution to the original concentrations of additives and copper ions before being reused by the electroplating process.

IN THE DRAWINGS

DETAILED DESCRIPTION OF THE INVENTION

By electroplating bath, it is meant any plating bath used to plate a metal on a surface including but not limited to electroplating baths as well as electroless plating baths used in the semiconductor industry such as copper plating baths used for the plating of copper to semiconductor wafer surfaces.

Such baths generally contain a selected metal ion, such as copper or nickel that is to be plated, an acid such as sulfuric acid or phosphoric acid, chloride ions, and one or more wetting agents, brighteners, and complexing agents for the metal ions. Additionally, some baths may contain cyanide ions. These compositions are aqueous compositions and contain 50–150 g/l of a metal salt, such as anhydrous cupric sulfate, approximately 10% by volume of sulfuric acid, 50–75 mg/l of chloride ions, and up to 30 ml/l of proprietary organic additives.

Figure 1:
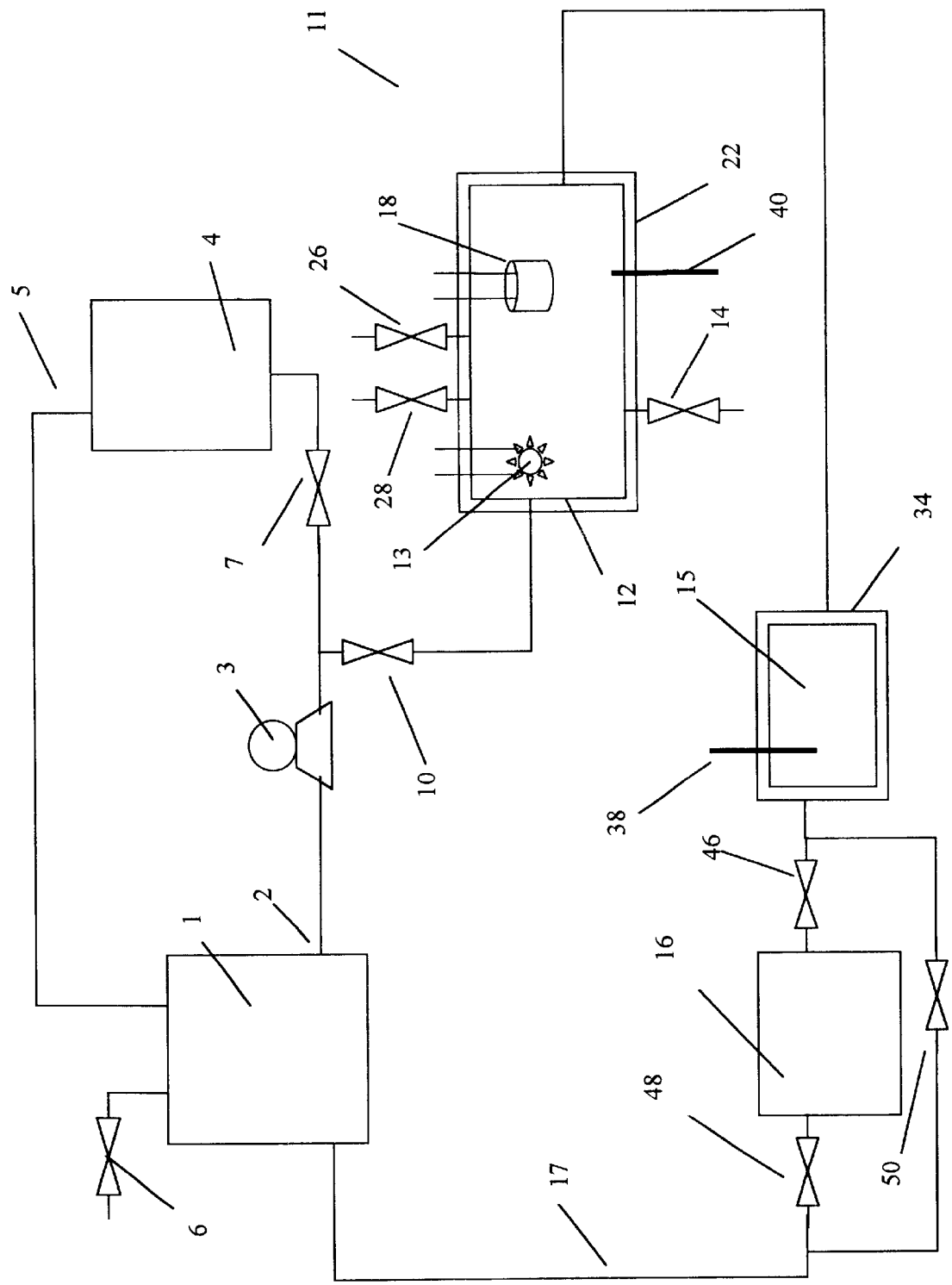
FIG. 1 shows a first embodiment of the present invention.

In a first preferred embodiment of the present invention, a system for removing one or more organic species present in a spent electroplating bath and recycling the cleaned bath is disclosed. In this embodiment, as shown in FIG. 1, there is a plating system comprising a plating reservoir 1, having an outlet 2 which is fed by pump 3, through valve 7 by gravity or other such means to the plating tool 4. An outlet 5 from the tool recycles the fluid back to reservoir 1. An additional fluid inlet to the tank 1 is provided for and controlled by valve 6. This is a conventional plating bath design. To this is added a valve 10 which draws the fluid from the plating system to a recycling system 11. This system consists of an oxidation unit 12 that contains an ultraviolet light energy source 13, thermal energy source 22, such as heating tapes and a chemical oxidant mixture. Oxidant gas introduction port 14 and oxidant gas exit port 26, as well as liquid oxidant addition port 28 are provided for introduction of oxidants to the oxidation unit 12. The oxidation unit 12 may be connected to the plating system as shown which allows for direct reclaiming of the spent fluid either on a batch or continuous basis or if one wishes it may be connected to a separate reservoir of spent fluid (not shown) for off line processing. In either case, the bath as it passes through the oxidation unit 12 is subjected to a source of radiant or acoustical such as ultrasonic, energy 13, thermal energy 22 and chemical oxidant mixture for a time and energy intensity to convert substantially all of the selected one or more organic contaminant species for removal to their breakdown products, typically various oxidized species, carbon dioxide and water.

One or more than one oxidation units may be used depending upon the volume to be processed, the level of organics and the number of different organics to be removed. If more than one unit is used in a system they may be arranged in parallel to split the fluid between them for better processing or in series to ensure that all the selected organics are suitably treated. In most cases it is preferred to remove all organic contaminants and start with essentially contaminant free liquid for reconstitution. However, in some cases, there may be a need to selectively remove only one or more, but not all, organic contaminants (e.g. those which cause problems with the plating system or those which are formed more frequently than the others). Additionally, the system can be configured to to selectively remove one or more organics, but not all of the organic contaminants, during normal system operation and then periodicly (e.g. every tenth cycle) the system be modified to remove most or all of the organic contaminants.

The temperature of the liquid in 12 is controlled by contact to an external source through a thermal control device 22 which is capable of supplying or removing thermal energy from the oxidation unit 12. Thermal energy may be provided by a resistance heater or through the use of microwave radiation. Thermal energy can be removed by thermoelectric coolers or circulation of a coolant through the thermal control device 22. The temperature of the liquid in 12 is measured with temperature sensing device 40. In an alternative embodiment the temperature of the liquid is controlled by heating or cooling the gas before it is delivered to the oxidation reactor through conduit 14 and exits the reactor through port 26 in FIG. 1. Heating the gas prior to injection into the liquid controls the temperature of the liquid, controls evaporation of excess solvent and acid halides from the liquid, and accelerates the oxidation reaction. The temperature of the liquid in 12 can range from 5–100° C. with preferred temperature range for the oxidation process from 45–90° C.

In systems which use a gas as one or the only oxidant, the concentration of the plating solution is controlled by the flow of an oxidant gas through the solution so as to effect both chemical oxidation and evaporation of the liquid solvent and volatile acid halides in the plating bath during the chemical oxidation process. The flow rate of gas, reaction time, bubble size and contact time, ultraviolet light intensity, and the temperature of the liquid and gas are used to control the reaction rate and the removal of solvent and acid halides from the solution as it is being treated in the oxidation unit.

The state of the oxidation process is indicated by a sensor 18 located in the liquid. The sensor 18 determines the duration of the oxidation process. After passing through the oxidation unit 12 and if required, residual oxidant is removed by an oxidant arrestor 15, which prevents oxidant from leaving the recycling system 11 for safety and downstream process compatibility considerations.

Removal of thermal energy from the treated liquid is performed in the oxidant arrestor 15 by heat removing device 34. For example cooling fluid may be re-circulated through device 34 via a closed loop chiller or alternatively thermoelectric coolers attached directly to the surface of 15 may be used. The temperature of the liquid is measured by temperature sensing device 38. Removal of heat from the treated liquid returns the liquid to its initial temperature and optimizes the contaminant removal performance of organic scavenger 16.

Chemical oxidants useful in this invention include ozone gas, hydrogen peroxide, oxygen gas, peracetic acid, peroxydisulfuric acid and its salts, ammonium persulfate, and potassium peroxymonosulfate. These oxidants may be used singly or as mixtures of these chemical oxidants. Examples which are particularly useful in the practice of this invention include but are not limited to, ozone and hydrogen peroxide, or ozone and ammonium persulfate. Concentration of hydrogen peroxide in the oxidizing solution can range from 0.1–30% by volume, with preferred concentration of 0.5–10% by volume. The concentration of ozone gas which is sparged into the liquid can range from 0.1% to 20% by weight in the gas with a preferred concentration of 3–20% by weight. The ranges of the oxidants in the system is based upon stoichiometric chemistry so as to remove the desired one or more organic contaminants to a predetermined threshold value while using as little excess oxidant as possible.

The chemical oxidants may be added in a batchwise manner, or a continuous manner. For example, hydrogen peroxide may be added all at once at the beginning of the oxidation process. Alternatively, the hydrogen peroxide is added all at once at the beginning of the oxidation process and ozone gas is sparged into the oxidation unit 12 on a continuous basis. In a preferred embodiment, a measurement of the initial contamination of the fluid is made by sensor 18 and a dose of hydrogen peroxide and ozone gas is made to the solution with application of energy from sources 13 and 22. After a period of time, another measurement is made of the concentration of the organic contaminant in the bath by sensor 18 and additional hydrogen peroxide and or ozone gas is introduced to the liquid in the oxidation unit 12. The process of measurement and addition of oxidants continues until the concentration of one or more of the organic contaminant reaches a threshold value for the process.

Sources of energy useful in the system include electric, thermal, acoustic, microwave and electromagnetic sources of energy. Combinations of energy sources, including but not limited to ultraviolet light and heat, or ultraviolet light plus heat and megasonic energy are also useful in the practice of this invention.

Devices useful in the removal of heat from the system include heat exchangers, thermoelectric chillers applied to the surface oxidation unit 12 or arrestor 15, or liquid cooled jacketed sleeves through which the treated liquid flows.

The sensor 18 used in the system of this invention may be in-line or may sample solution from the bath for analysis by an off-line analyzer. Sensors useful for this invention include total organic carbon (TOC) analyzers, cyclic voltametric stripping analysis, oxidation reduction potential sensors, ion selective sensors such as pH sensors and other such sensors, gas and liquid ozone concentration detectors, non dispersive infrared carbon dioxide detector, infrared and ultraviolet/visible spectrophotometers, viscometer, gas and liquid sensors including quartz microbalance and surface acoustic waved adsorptive type, conductivity sensors, surface tension analyzer, refractive index detector, high performance liquid chromatography and gas chromatography.

If necessary and following heat removal and removal of excess chemical oxidant in unit 15, residual additive or breakdown components not removed in oxidation unit 12 are then removed by an organics scavenger material 16. The scavenger material 16 may be selective for certain materials so as to only remove those of interest or in applications where all organics are removed it may be more non-specific. The scavenging material 16 also may remove chloride ions present in the spent solution if desired. Examples of selective organic scavenging materials include size exclusion resins and ultrafiltration membranes. Bypass of the organic scavenger material may be achieved in this invention by closing valves 46 and 48 and opening valve 50 as shown in FIG. 1.

The purified and regenerated solution is then either returned to the plating system for reuse via a conduit 17 or is stored in a separate reservoir (not shown) or a container (not shown) for shipment back to the plating system.

Figure 2:
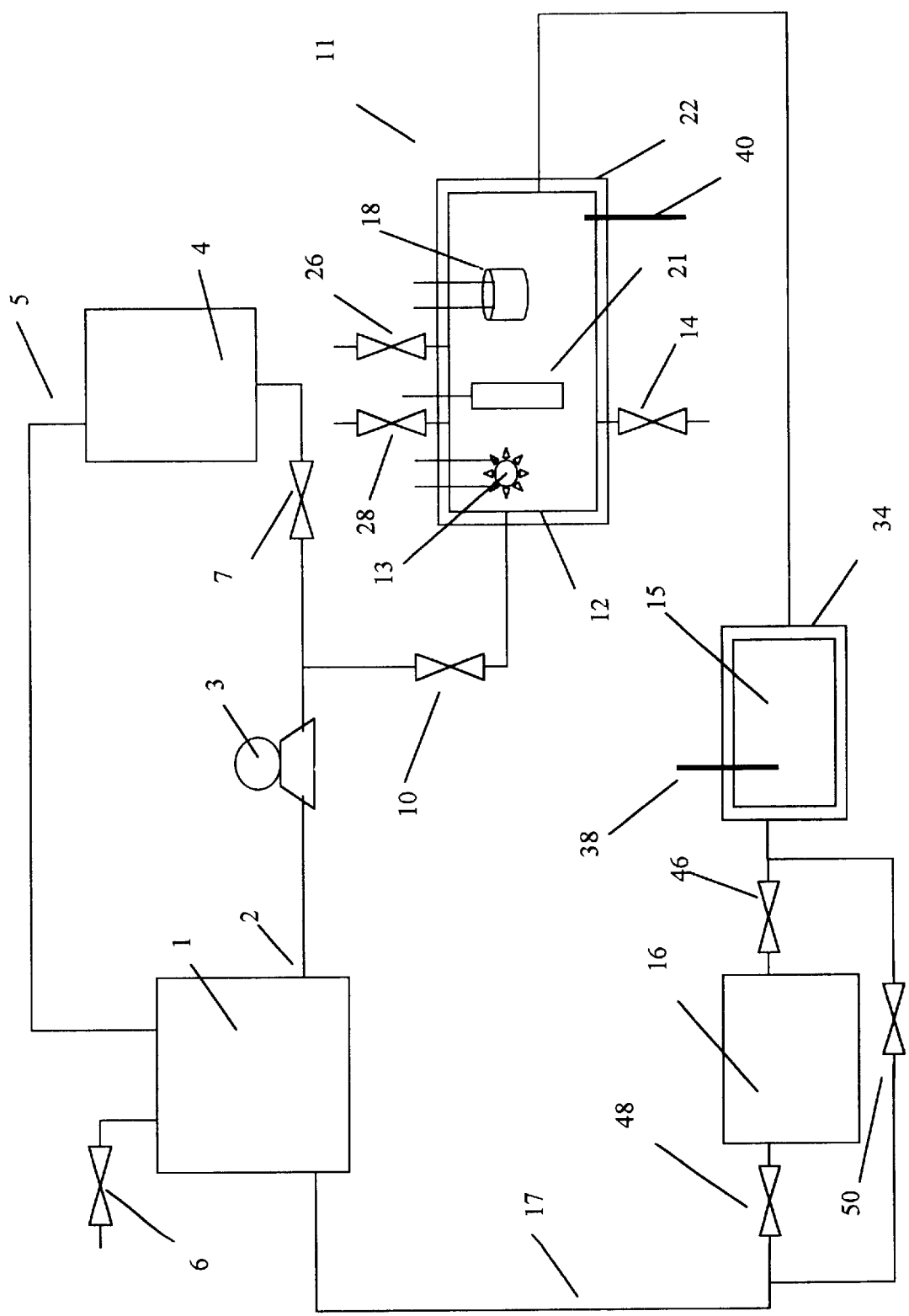
FIG. 2 shows a second embodiment of the present invention.

In a second embodiment of the present invention, one may use the same system as shown in FIG. 1 and the same numbers in FIG. 2 correspond to those elements shown in FIG. 1. However, in addition to the energy source 13 and chemical oxidants 14 and 26, and sensor 18, there is a catalyst 21 adjacent the UV light 13 that increases the rate of the oxidation process of one or more organic contaminants present in the liquid. Typical catalysts used for this purpose include but are not limited to iron, stainless steel, titanium, palladium, gold, silver, vanadium, their oxides and their alloys as well as salts of these metals. These catalysts may simply be placed adjacent the energy source or if desired, they may be connected to an electrical potential in order to increase their efficiency.

Figure 3:
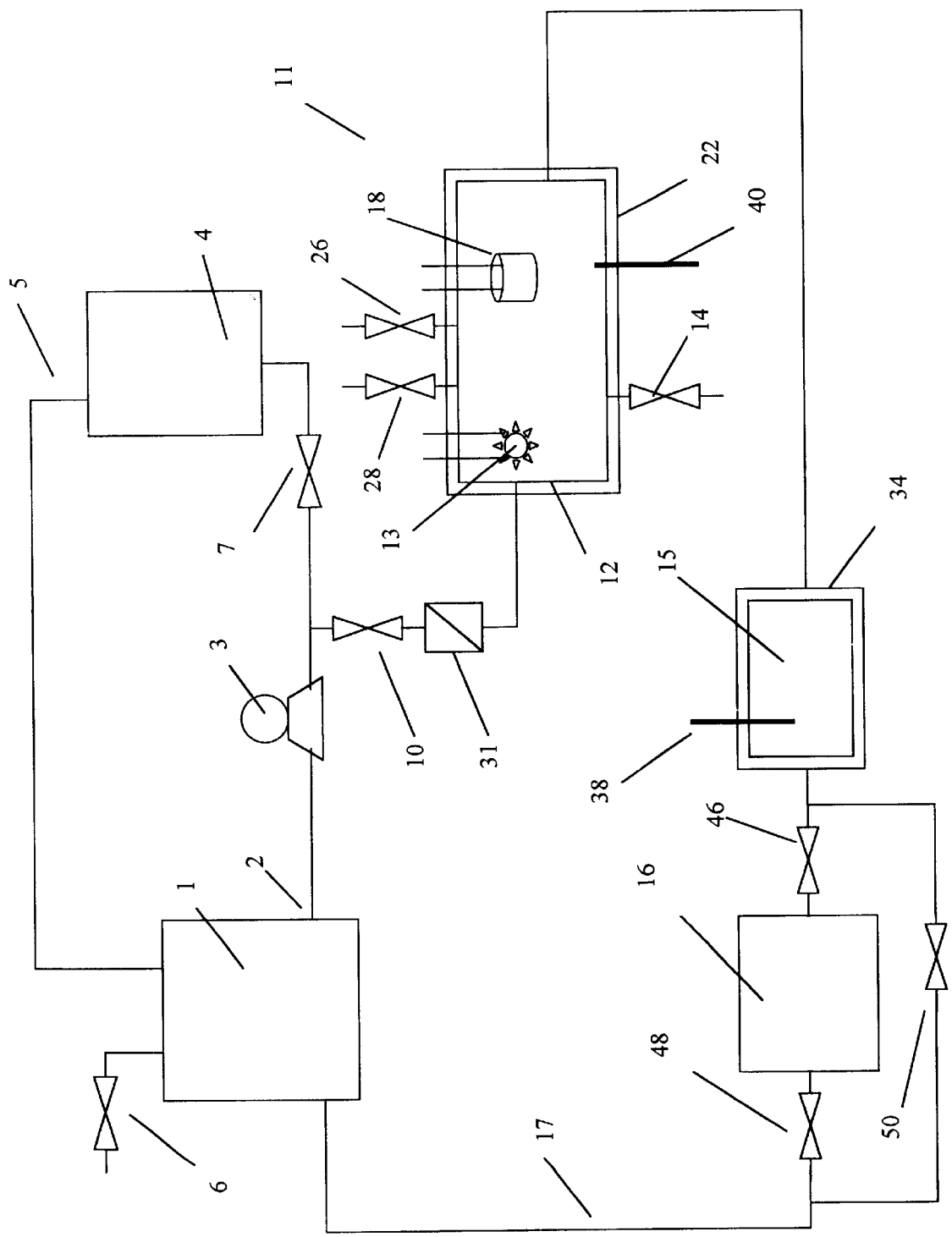
FIG. 3 shows a third embodiment of the present invention.

As shown in FIG. 3, a prefilter device 31 is downstream of the entrance 10 to the recycling system but upstream of the oxidation unit 12. This step may either remove any particulate material present in the fluid and/or may be used to pretreat the liquid by physical separation, chemisorption and physisorption of one or more contaminants in the liquid and reduce the amount of one or more contaminants present in the system. One may use centrifugation, absorbent mops/pads or filters, particularly carbon filters, with carbon filters being the preferred method of removal.

Carbon filters by themselves do not provide sufficient organic carbon contaminant removal. However, they are useful in reducing the initial level of the one or more organic carbon contaminant making the oxidation treatment more effective and also reduces the level of particulate matter in the bath.

Alternatively, other filters such as microporous filters and/ultrafiltration filters formed of various plastics such as polyethylene including ultrahigh molecular weight polyethylene, polypropylene, PTFE resin, thermoplastic perfluoropolymers such as PFA, PVDF, etc.; glass fibers or mats or carbon fibers or compacted carbon particles may be used to primarily remove any particulate matter (although some organic components may be retained in the filter as well).

Additionally, oil mops, absorptive pads and other such devices commonly used to remove oils, scum and other organic contaminants from baths may be used alone or in combination with any of the above. After passing through the prefilter device 31, the fluid passes through the oxidation unit 12 to remove the remaining organic carbon contaminant. The state of the oxidation process is determined by sensor 18 and the oxidation process continued until a threshold value of chemical purity for the treated solution is attained. Residual thermal energy and chemical oxidant are removed by the arrestor 15. The residue generated by the oxidation reaction of the one or more organic contaminants in the oxidation unit 12 (and optionally catalyst) are then removed in the organics scavenger 16. The cleaned fluid is either returned to the bath or to a storage tank for further use.

Figure 4:
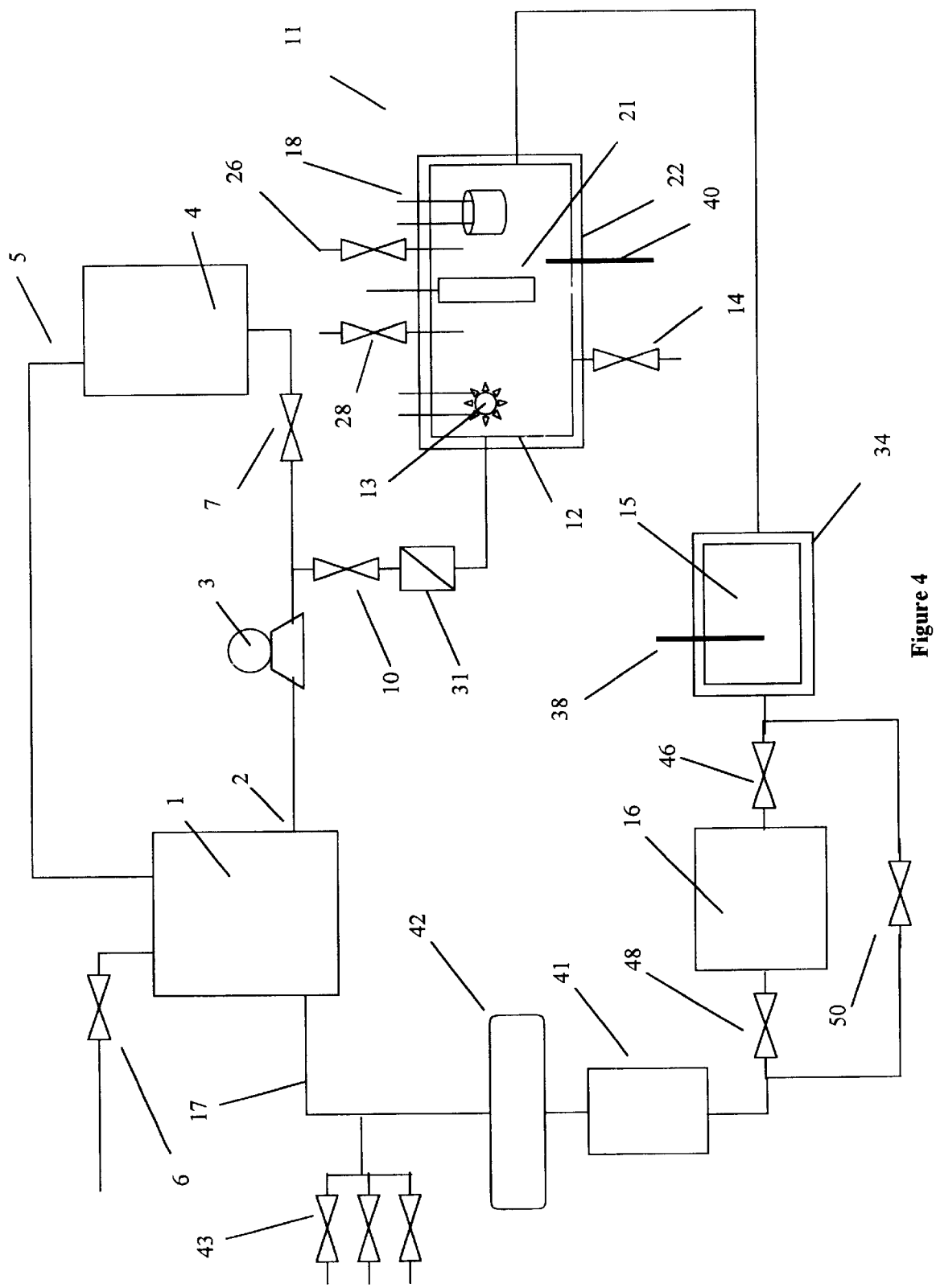
FIG. 4 shows a fourth embodiment of the present invention.

The most complete system is shown in FIG. 4. In this embodiment, the fluid is pretreated with one or more filters 31 and then treated in the oxidation unit 12 by a combination of an energy source and chemical oxidants in the presence of catalyst 21. The state of the oxidation process for one or more organic contaminants is determined by sensor 18 and the oxidation process continued until a threshold value of chemical purity for the treated solution is attained. It is then treated with the arrestor 15 to remove both excess chemical oxidant and thermal energy, an organic scavenger 16, metal ion removing device 41, a final filtration to remove suspended particles 42, a chemical replenishing stage 43, and then returned to either the bath or a storage tank.

The system is made of a number of components that are commercially available as described below.

Ozone gas that can be used as one of the chemical oxidants and also as a sparge gas, is delivered to the liquid and is generated preferably by the silent electric discharge method. High purity ozone generators are commercially available from Applied Science and Technology, Inc. of Woburn, Mass. Ozone can also be generated by in-situ electrolysis of a sulfuric acid containing solution. The ozone gas generator should be capable of generating from 0.5 to about 20 percent ozone gas in oxygen by weight. Alternatively, bottled ozone gas or other methods of generating ozone may be used if desired. Peroxydisulfuric acid can be produced by contacting ozone gas with sulfuric acid.

Gaseous ozone generated can be introduced into the liquid by use of devices that are chemically inert to ozone and the bath fluid. Such materials include but are not limited to Kynar® resin, polyvinylidene fluoride, polyfluoroalkoxy fluoropolymer, or Teflon® resin.

Porous or fritted Teflon® resin based diffusers wherein the ozone gas is sparged into the liquid as bubble of gas are available from Porex Porous Products, Fairburn, Ga. Spargers from sintered metal tubes available from Millipore Corporation, Bedford, Mass. Sintered glass or ceramic spargers are available from Fisher Scientific, Pittsburgh, Pa. Preferred pore sizes for the sparger are from 2–50 um and the material chosen so that it is wetted by the liquid solution in to provide the greatest number of small bubbles for gas to liquid mass transfer.

A static mixer and gas injector constructed of quartz or Kynar® can also be used to introduce the gaseous oxidant such as ozone, oxygen or ozone/oxygen blends into the liquid with mixing of the gas and liquid being facilitated by mixer. A Kynar® static mixer is available from Cole Palmer Instrument Company, Vernon Hills, Ill.

Ozone gas can also be introduced into the liquid by contacting the liquid with the ozone gas through a membrane device such as a porous hollow fiber, hollow tube, or flat sheet polymeric membrane. The ozone gas can be at a pressure equal to or lower than the liquid to effect a bubble free transfer of ozone into the liquid. Alternatively the pressure of the ozone gas can be greater than the liquid pressure effectively making the hollow fiber device a gas sparger. A Teflon® resin hollow fiber or hollow tube ozone contactor is commercially available from W. L. Gore & Associated, Inc., Elkton, Md. Flat sheet Teflone® resin membranes filter devices are available from Millipore Corporation, Bedford, Mass.

The concentration of ozone gas in the liquid can be controlled by varying the flow of the liquid, the concentration of the ozone gas produced by the generator, the pH of the liquid, and the temperature of the liquid and gas. It is preferable to introduce the highest concentration of ozone gas into the liquid to effect the highest rate of decomposition of one or more organic materials in the liquid.

Liquid chemical oxidants can be introduced into the oxidation unit in combination with the gas oxidant by pressure dispense or use of mechanical or diaphragm pumps. Corrosion resistant diaphragm pumps useful for chemical dispensing of liquid oxidants or concentrated aqueous solutions of solid oxidants, Wafergard® Chemical Dispense Pumps, are available from Millipore Corporation, Bedford, Mass.

Ultraviolet light can be used in 13 as a source of electromagnetic energy for the oxidation process. Ultraviolet light or lights are selected for use depending upon the organic species that are to be removed. Typically, they are of a wavelength from about 100 nanometers (nm) to 800 nm, preferably from about 150–300 nm or 200 to 800 nm. More preferably, there are at least two UV light sources, the first having a preferred wavelength of 150–300 nm and a second having a preferred wavelength of 200 to 800 nm. The power of the lamps should be greater than 1 watt and less than 2000 watts. More preferably they are between 25 and 1200 watts. The lower wavelength light is particularly useful in oxidizing the surfactants and other typical organic materials. The upper wavelength light is particularly useful in oxidizing various complexing agents such as ethylene diamine tetracetic acid (EDTA). Ultraviolet light sources may also be used as a source of thermal energy.

An example of a suitable light source is a mercury vapor type ultraviolet light. Another is Model No. GPH287T5VH-S400-CB from Voltarc Technologies of Fairfield, Conn.

The light(s) is preferably separated from the actual fluid by a quartz window or sleeve that is commercially available from Corning, Inc. of Corning, N.Y. or Ace Glass Incorporated of Vineland, N.J. The window or sleeve is mounted within the oxidation unit 12 and sealed from the fluid in the oxidation unit by inert materials such as VITON or TEFLON resin sealants. See U.S. Pat. Nos. 5,272,091 and 5,868,924 for examples of such UV lights and means for sealing them within quartz devices, the teachings of which are incorporated herein by reference in their entireties.

The fluid is preferably subjected to the ultraviolet light, oxidant gas and liquid chemical oxidant for a period of time sufficient to oxidize substantially all of the one or more organic contaminants present to smaller oxidized species, carbon dioxide, and water. Depending upon the depth of the fluid compared to the light, the flow rate of the fluid past the light, the wavelength and the intensity of the ultraviolet light, the temperature of the liquid, the use of a catalyst, the concentration of oxidant gas, the level of organic contamination present and other such factors, it is typical for the fluid to spend between 2 and 240 minutes in the oxidation unit, preferably between 30 and 120 minutes. In one embodiment of the present invention, the oxidation unit is a simple tube into which an ultraviolet light has been mounted. Alternatively, it may be a relatively flat oxidation unit or a sealed box having a length and width that are greater than its height so as to spread out the bath into a thin width ribbon of fluid which then is subjected to the oxidation treatment. This is a more effective arrangement as the level of fluid to be penetrated is relatively low and uniform, which leads to a faster, more complete oxidation. Another alternative is to use a reservoir or storage tank and inject the ozone in the tank while irradiating the tank with UV light.

Other arrangements of the lamps can also be made, such as using two or more ultraviolet light sources in parallel in the oxidation unit to ensure the greatest flux of energy into the solution for the oxidation process.

Analysis of the state of the oxidation reaction in 12 can be monitored by a variety of sensing devices 18. For example total organic carbon analyzers are available Shimadzu, Kyoto, Japan, and ozone gas and liquid concentration monitors are available from IN USA, of Needham, Mass. Redox sensors useful in the practice of this invention are available from Orion Research Inc. of Beverly, Mass.

Following the oxidation unit 12, the residual ozone and chemical oxidant are removed from the system via an arrestor 15. For oxidant gases, gas removal may be in the form of a simple degasser such as a membrane device with a vacuum on the side of the membrane opposite the fluid. Gas is simply pulled through the membrane and disposed of in a proper manner. Oxidant gas removal may also be effected by sparging an inert gas like nitrogen through the solution. Alternatively the ozone arrestor may be a catalytic membrane such as is shown in U.S. Pat. No. 5,891,402. In this device, a catalyst is retained within a microporous PTFE substrate and the ozone containing liquid is flowed through the membrane such that the ozone is reduced to oxygen. Excess chemical oxidant can be removed by contacting the solution with a catalyst. For example, a platinum wire mesh is useful for decomposing hydrogen peroxide and is available from Aldrich Chemical, Milwaukee, Wis.

Ozone may be removed from the liquid by passing the ozone laden fluid through a bed of catalytic material. The ozone in the liquid is converted to ozone by-products which are removed from the liquid by vacuum or other suitable means. Suitable catalytic materials include those described in U.S. Pat. No. 5,891,402 such as manganese dioxide, copper oxide, titanium dioxide, platinum, activated carbon. Alternatively, ozone may be removed from the solution by sparging the ozone laden fluid with a gas such as nitrogen and exposure of the solution to 254 nanometer wavelength light from a mercury arc lamp.

Following the oxidation unit 12 and in conjunction with the removal of chemical oxidants from the liquid, the residual thermal energy in the liquid is also preferably removed in arrestor 15. Alternatively, one may simply leave any residual thermal energy in the liquid, especially if it is to be heated before use. Suitable devices for removing thermal energy from the liquid in arrestor 15 include heat exchanges used with available chilled water systems or with self contained re-circulating liquid chillers both available from McMaster Carr, New Brunswick, N.J. Thermoelectric modules for removing heat from the liquid can be attached to the surface of arrestor 15 and available from INB Products, Van Nuys, Calif.

Following the removal of ozone, the spent electroplating solution is passed through one or more organic scavenger devices such as absorptive filters and/or beds for the removal of the oxidized species. A preferred device for the scavenger unit is a filter for removing the residual selected organics. One may either select a device which is specific for the organic material to be removed (based on charge, size exclusion using ultrafiltration, hydrophobicity/philicity or other means) or select one which removes all residual organic materials if so desired. Such a filter may be a carbon, activated carbon or charcoal filter, such as extruded carbon filters from KX Industries, L.P. of Orange, Conn. or carbon filter (matrix of heat-bonded carbon particles and polymeric fibers) from Fibridyne of Suffield, N.H. Other filters that are designed to remove or scavenge organic components may also be used in the present invention. Also, a fibrous structure comprising a composite fiber matrix may be used to immobilize activated carbon or modified resins. This technology is available from AQF Technologies LLC, of Charlotte, N.C. (U.S. Pat. No. 5,486,410). Poly-vinylidene fluoride based ultrafiltration membranes are tangential flow filtration devices are available from Millipore Corporation of Bedford, Mass.

If one selects a bed for the scavenger unit it is preferred to use a mixed bed of anionic and cationic resin particles. Preferably, the one or more beds will also contain some or all activated carbon or charcoal to remove any nonionic species present such as chloride ions. Preferably, the resins are anionic and cationic exchange resins as are commonly used in chromatography. Alternatively, especially when removing only selected organics, one can use ligand containing media and other such highly selective materials to ensure that only the organics desired to be removed are in fact removed.

After the residual organic breakdown materials are removed, the solution may, if desired, be sent to a metal ion removal stage. The purification of spent plating solution through the removal of one or more metal ion impurities may comprise of a pleated filter cartridge such as Millipore's Chempure™ II technology, that contains an ion exchange resin and/or ligands to remove one or more metal ion impurities such as iron. Alternatively, the fibrous structure from AQF Technologies LLC, described above, can be used to immobilize functional resins to remove one or more metal impurities. An example of such resins is available from Eichrom Industries. Eichrom's Diphonix® resin is specifically designed to remove iron ions from acidic, copper plating solutions.

Other techniques such as selectively plating one or more metal ion impurities may be used to purify the spent electroplating solution. Alternatively, electrodialysis of the treated solution may be used to remove one or more metal cations or anionic impurities.

After or in conjunction with ion exchange resins, one may include filters for the removal of any particulate matter. These may include microporous filters such as hydrophilic and hydrophobic UPE, PTFE and non-dewetting PTFE microporous filters that are available from Millipore Corporation of Bedford, Mass.

In all of these embodiments, the goal is to remove the selected one or more organic contaminants from the degraded plating additives and also to reduce other unwanted materials, such as iron ions and/or chloride ions or particulates, and recycle the cleaned fluid for reuse rather than disposal. The ability of the system to reach the fresh solution levels depends upon a number of factors, including the level of initial one or more organic contaminants, any pretreatment, the wavelength and intensity of UV light, temperature of the solution, the concentration of chemical oxidants introduced and the residence time in the oxidation area.

The following examples are given for the purposes of illustrating the novel process and system of the invention. However, it is to be understood that these examples are merely illustrative in nature and that the present invention is not necessarily limited by them.

EXAMPLE 1

The removal of plating additives from a copper plating solution in the presence of copper ions by a reactor from the system shown in FIG. 1 is illustrated. The state of the oxidation process was monitored by a total organic carbon analyzer and an ozone gas monitor. A water cooled, jacketed, quartz tube which contained a 400 watt medium pressure mercury arc lamp from Sunlight Systems, Bogota, N.J. was placed in the center of a 3 liter glass reactor from ACE Glass, Vineland, N.J. Ozone gas was supplied to the solution in the reactor by ozone generator AX8400 from Astex, Inc, Woburn, Mass. through a ceramic sparger. An ozone gas monitor from IN USA, of Needham, Mass. was connected to the reactor gas outlet, 26 and along with the total organic carbon analyzer served as an endpoint monitor for the state of the oxidation reaction.

Two liters of a solution containing approximately 70 grams per liter of copper sulfate at a pH of about 0.5 and containing plating additives of concentration approximately 45 ppm total organic carbon was prepared and charged into the reactor. Ozone gas, in a concentration 15 percent by weight, was then sparged into the copper sulfate solution containing the plating additives. The 400 watt ultraviolet lamp was energized and the temperature of the solution was controlled at 70 degrees Celsius using the heat emitted from the ultraviolet lamp and cooling from a heat exchanger.

Figure 5:
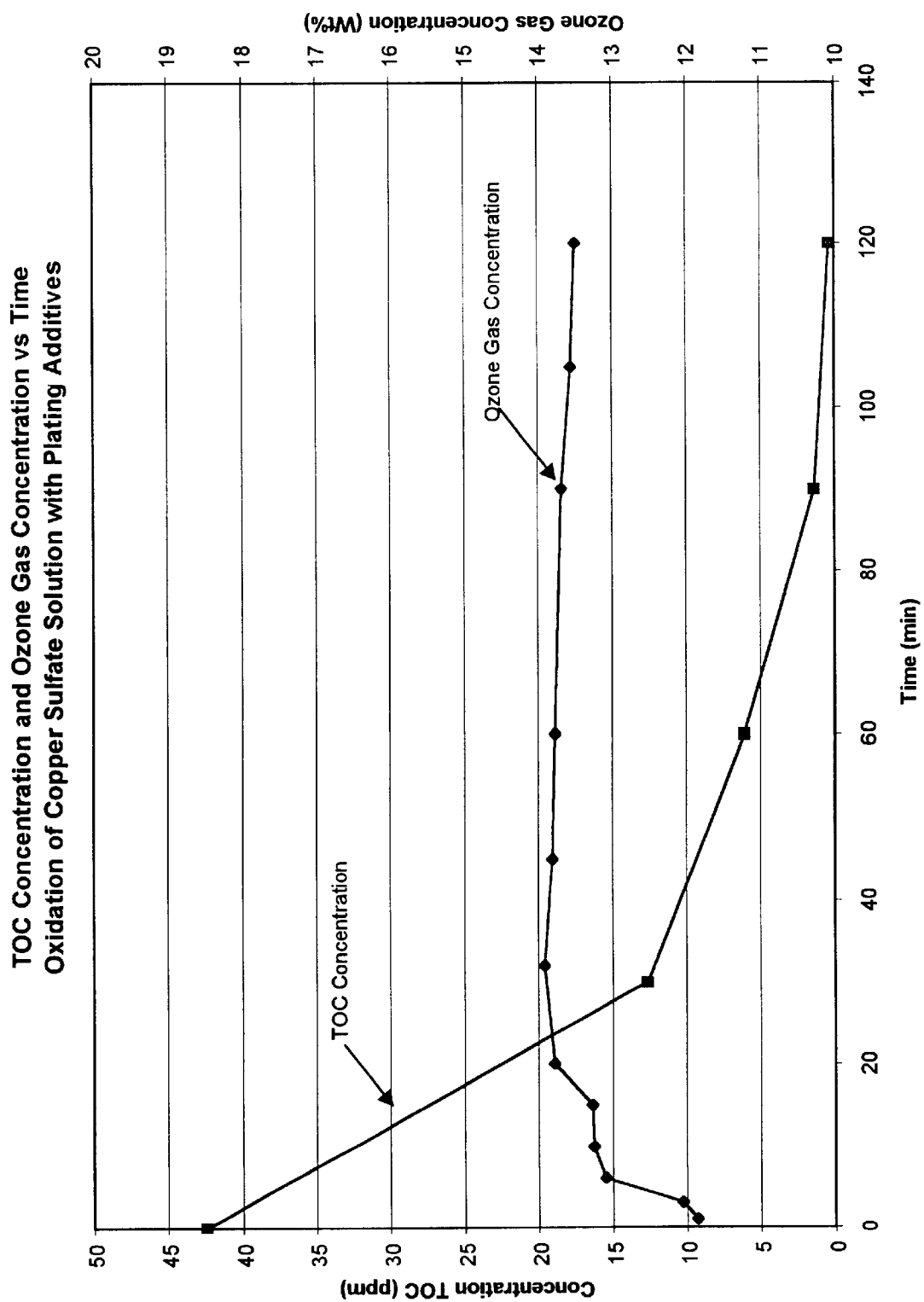
FIG. 5 shows the results of the oxidation process of Example 1.

The results of the oxidation process are represented graphically in FIG. 5. The results in FIG. 5 show that the system and method of the invention are capable of reducing the concentration of organic plating additives in the presence of copper ions in the solution. The response of the ozone gas concentration monitor, as shown in FIG. 5, measures the consumption of ozone gas during the oxidation process. When the oxidation process is complete the concentration of the ozone gas returns to the feed gas concentration of about 15 percent by weight. This result shows that the ozone gas concentration monitor is useful as a measure of the state of the oxidation process in the reactor.

EXAMPLE 2

The removal of high concentrations of plating additives from a copper plating solution with ozone gas and hydrogen peroxide in the presence of copper ions by a reactor from the system shown in FIG. 1 is illustrated. The state of the oxidation process was monitored by a total organic carbon analyzer and an ozone gas monitor. A water cooled, jacketed, quartz tube which contained a 400 watt medium pressure mercury arc lamp from Sunlight Systems, Bogota, N.J. was placed in the center of a 3 liter glass reactor from ACE Glass, Vineland, N.J. Ozone gas was supplied to the solution in the reactor by ozone Generator AX8400 from Astex, Inc, Woburn, Mass. through a ceramic sparger. An ozone gas monitor from IN USA, of Needham, Mass. was connected to the reactor gas outlet, 26 and along with the total organic carbon analyzer served as an endpoint monitor for the state of the oxidation reaction.

Two liters of a solution containing approximately 125 grams per liter of copper sulfate at a pH of about 1 and containing plating additives of concentration approximately 1450 ppm total organic carbon was prepared and charged into the reactor. 180 milliliters of 30% hydrogen peroxide from Ashland Chemical was added to the solution and then ozone gas, concentration 15 percent by weight, was sparged into the copper sulfate solution containing the plating additives. The 400 watt ultraviolet lamp was energized and the temperature of the solution was controlled at 70 degrees Celsius using the heat emitted from the ultraviolet lamp and cooling from a heat exchanger.

Figure 6:
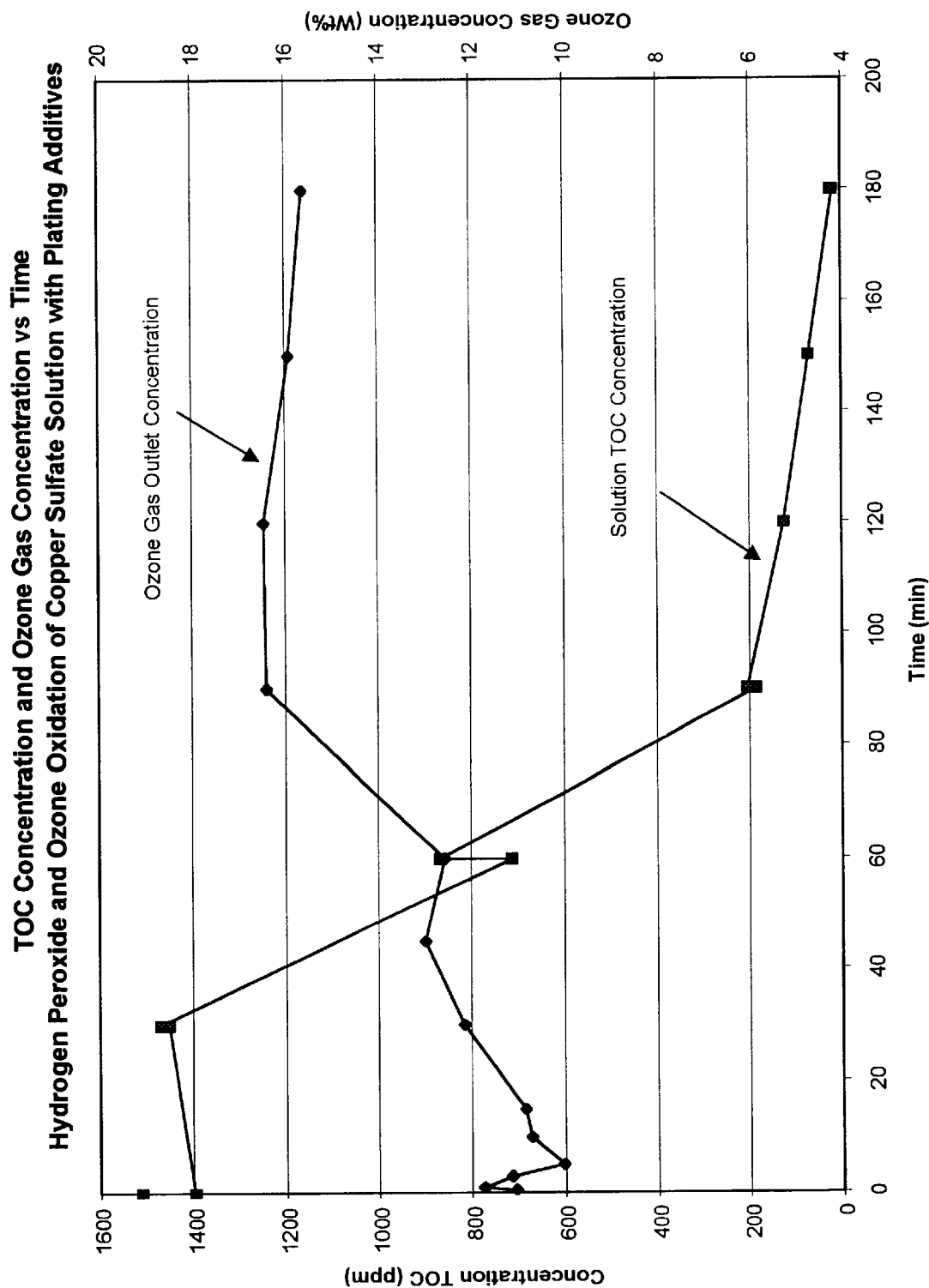
FIG. 6 shows the results of Example 2.

The results of the oxidation process are represented graphically in FIG. 6. After 90 minutes the total organic carbon concentration is reduced by 86% and after 180 minutes the total organic carbon concentration is reduced by 98%. The results in FIG. 6 show that the system and method of the invention are capable of reducing the concentration of organic plating additives in the presence of copper ions in the solution. The response of the ozone gas concentration monitor, as shown in FIG. 6, measures the consumption of ozone gas during the oxidation process. When the oxidation process is complete the concentration of the ozone gas returns to feed gas concentration of about 15 percent by weight.

EXAMPLE 3

The removal of plating additives from a copper plating solution with ozone gas, hydrogen peroxide, and carbon filtration in the presence of copper ions by a reactor from the system shown in FIG. 1 is illustrated. The state of the oxidation process was monitored by a total organic carbon analyzer and an ozone gas monitor. A water cooled, jacketed, quartz tube which contained a 400 watt medium pressure mercury arc lamp from Sunlight Systems, Bogota, N.J. was placed in the center of a 3 liter glass reactor from ACE Glass, Vineland, N.J. Ozone gas was supplied to the solution in the reactor by ozone Generator AX8400 from Astex, Inc, Woburn, Mass. through a ceramic sparger. An ozone gas monitor from IN USA, of Needham, Mass. was connected to the reactor gas outlet. A carbon filter from KX Industries L.P., of Orange, Conn., was connected to the outlet of the reactor and oxidized solution pumped through the filter. The total organic carbon analyzer served as an endpoint monitor for the state of the process.

Two liters of a solution containing approximately 125 grams per liter of copper sulfate at a pH of about 1 and containing plating additives of concentration approximately 2250 ppm total organic carbon was prepared and charged into the reactor. Hydrogen peroxide, 180 milliliters, from Ashland Chemical was added to the solution and then ozone gas, concentration 15 percent by weight, was then sparged into the copper sulfate solution containing the plating additives. The 400 watt ultraviolet lamp was energized and the temperature of the solution was controlled at 70 degrees Celsius using the heat emitted from the ultraviolet lamp and cooling from a heat exchanger. After 90 minutes the solution was removed from the reactor and pumped through the carbon filter.

Figure 7:
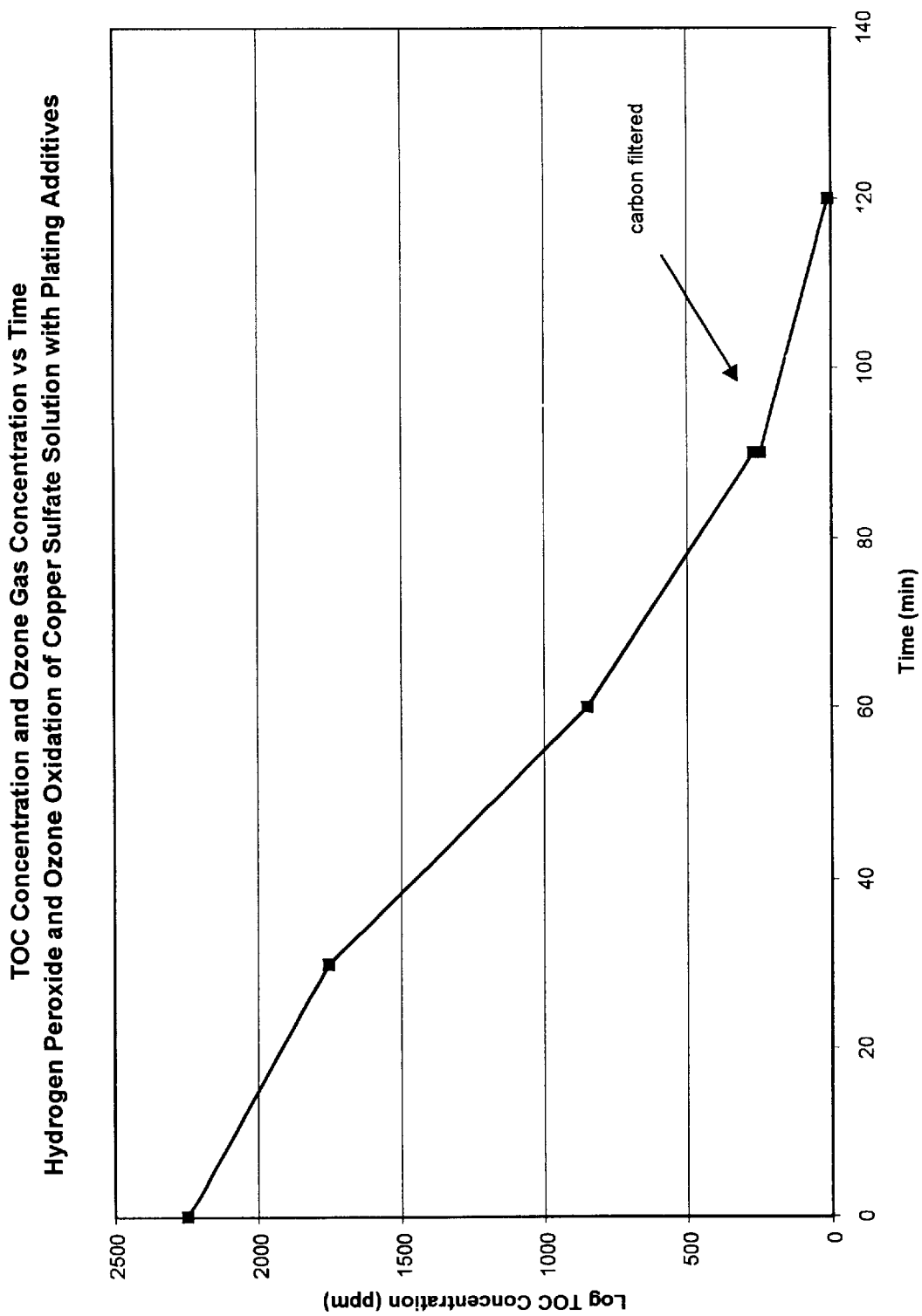
FIG. 7 shows the results of Example 3.

The results of the process are represented graphically in FIG. 7. After 90 minutes the total organic carbon concentration was reduced from 2250 parts per million to 245 parts per million by the oxidation process. Carbon filtration further reduced the total organic carbon from 245 parts per million to 11 parts per million. The results in FIG. 7 show that the system and method of the invention are capable of reducing the concentration of organic plating additives by oxidation and carbon filtration in the presence of copper ions.

EXAMPLE 4

The removal of plating additives from a copper plating solution in an in-line, continuous process, with ozone gas, and carbon filtration in the presence of copper ions by a reactor from the system shown in FIG. 1 is illustrated. The state of the oxidation process was monitored by a total organic carbon analyzer. Two 3 liter Teflon® PFA containers served as reactors and were connected to each other in series. Each reactor contained a quartz tube in which a 400 watt medium pressure mercury arc lamp from Sunlight Systems, Bogota, N.J. was placed. The quartz tubes were cooled with a flow of nitrogen gas. Liquid was pumped through the reactors using a gear pump with Teflon® gears. Ozone gas was supplied to each reactor by ozone Generator AX8400 from Astex, Inc, Woburn, Mass. through a ceramic sparger in each reactor. An ozone gas monitor from IN USA, of Needham, Mass. was connected to the reactor gas outlets. A third 3 liter Teflon® PFA reactor container was connected to the outlet of the second reactor and a flow of nitrogen gas and a 25 watt 254 nm UV lamp served to remove ozone from the treated solution before being carbon filtered. A carbon filter from KX Industries L.P., Orange, Conn., was connected to the outlet of the last reactor and the oxidized solution pumped through the filter. The total organic carbon analysis of samples of the treated solution after carbon filtration served as an endpoint monitor for the state of the oxidation process.

A solution containing approximately 70 grams per liter of copper sulfate at a pH of about 0.5 and containing plating additives of concentration approximately 50 ppm total organic carbon was continuously fed into the reactors. Ozone gas, concentration 15 percent by weight, was then sparged into the copper sulfate solution in the first two reactors each containing the plating additives and copper ion containing solution. The 400 watt ultra violet lamps were energized and the solution was heated to 90 degrees Celsius by heating from the lamps.

Figure 8:
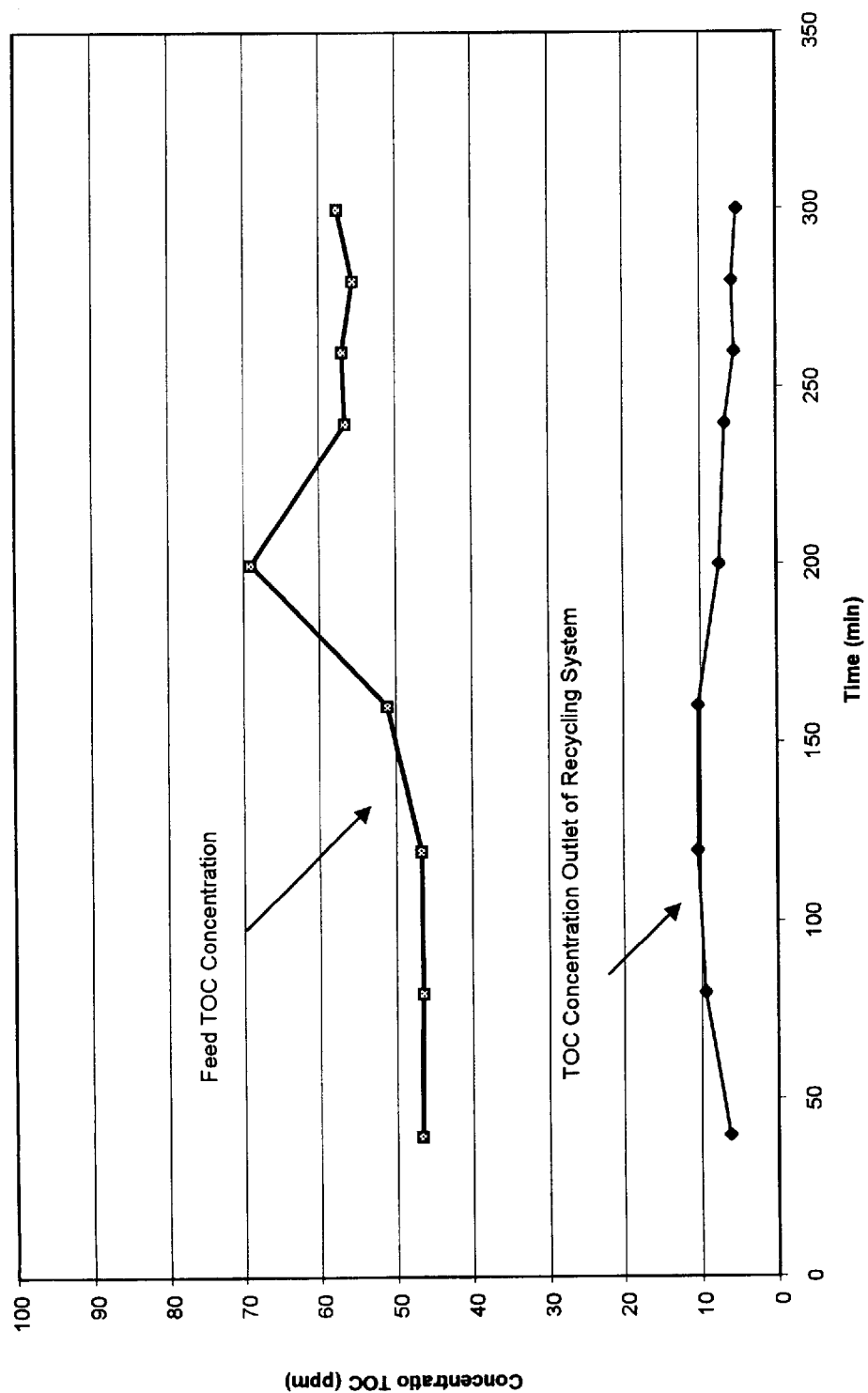
FIG. 8 shows the results of Example 4.

The results of the process are represented graphically in FIG. 8. The total organic concentration of the feed solution ranged from 48 to 70 parts per million. Regardless of the feed concentration of organic carbon, the system and method of the invention are capable of reducing the feed concentration of organic plating additives to less than 10 ppm continuously by oxidation and carbon filtration in the presence of copper ions.

What we claim:

1. A system for the recycling of spent fluid from a plating bath comprising an outlet from a plating bath, one or more oxidation units connected to the outlet from the bath, each said oxidation unit coupled to one or more controlled sources of energy and chemical oxidants that are directed to the fluid of the bath as said fluid passes through each said oxidation unit in order to break down one or more selected organic contaminants to form one or more oxidized organics, one or more sensors for sensing the state of an oxidation reaction, an arrestor for removing chemical oxidant and thermal energy from the fluid and an outlet from the system.

2. The system of claim 1 wherein the outlet from the system is connected to an inlet wherein the inlet is attached to a fluid storage unit selected from the group consisting of the plating bath and a separate reservoir.

3. The system of claim 1 further comprising a scavenger which removes chloride ions.

4. The system of claim 1 further comprising an inorganic removal system for removing one or more deleterious metal ions, said inorganic removal system being mounted downstream of the arrestor.

5. The system of claim 1 wherein the outlet from the system is to an inlet of a separate reservoir.

6. The system of claim 5 wherein the outlet from the system is sent to a chemical additive replenishing stage before being sent to the inlet.

7. The system of claim 1 wherein the one or more oxidation units contains a catalyst for enhancing an oxidation reaction of the one or more controlled sources of energy with the one or more selected organic contaminants.

8. The system of claim 1 wherein a prefilter located upstream of the one or more oxidation units is used to reduce the level of material sent to the oxidation unit wherein the material is selected from the group consisting of one or more selected organic contaminants and particulate material.

9. The system of claim 1 wherein an oil mop or absorptive pad is used to reduce the level of organic material sent to the oxidation unit.

10. The system of claim 1 wherein the outlet from the system is sent to the inlet of the bath, further comprising an inorganic removal system for removing one or more deleterious metal ions and anions and a prefilter mounted upstream of the oxidation unit to remove particulate matter.

11. The system of claim 1 wherein unused chemical oxidants are destroyed by UV light.

12. The system of claim 1 wherein unused chemical oxidants are removed by a catalytic material in a form selected from the group consisting of beds and filters.

13. The system of claim 1 wherein chloride ions are removed along with one or more oxidized organics.

14. The system of claim 1 wherein chloride ions are removed using anionic and/or cationic exchange resins.

15. The system of claim 1 wherein one or more metal ion impurities are removed using a pleated filter cartridge containing ion exchange resin.

16. The system of claim 1 wherein one or more metal ion impurities are selectively removed using ion specific resins.

17. The system of claim 1 wherein one or more metal ion impurities are selectively removed using ion specific resins contained in a fibrous structure to immobilize the ion specific resins.

18. The system of claim 1 wherein one or more metal impurities are removed through selectively plating out one or more metal ion impurities.

19. The system of claim 1 wherein filters are used to remove particulate matter after one or more organic impurities and one or more metal ion impurities are removed.

20. The system of claim 1 wherein ozone gas is introduced into the one or more oxidation units by contacting the spent fluid with the ozone gas through a membrane device formed of one or more membranes in the form selected from the group consisting of a porous hollow fiber, a hollow tube and a flat sheet polymeric membrane.

21. The system of claim 1 wherein ozone gas is introduced into the one or more oxidation units by contacting the spent fluid with the ozone gas through a membrane contactor.

22. The system of claim 1 wherein ozone is introduced into the one or more oxidation units by porous or fritted PTFE resin or ceramic or sintered metal diffusers.

23. The system of claim 1 wherein ozone gas is introduced by combination of static mixer and gas injector.

24. The system of claim 1 further comprising an oxidation endpoint sensor mounted within the system to detect the end of the oxidation reaction.

25. The system of claim 24 wherein the oxidation endpoint sensor is used to control and stop the oxidation reaction once completion of the oxidation reaction is detected.

26. The system of claim 1 wherein the oxidants used in the system can be used singly or in combination and are selected from the group consisting of hydrogen peroxide, ozone, oxygen, peroxydisulfuric acid and its salts, potassium peroxymonosulfate and mixtures thereof.

27. The system of claim 1 wherein the sources of energy can be used singly or in combination and are selected from the group consisting of electric, thermal, acoustic, microwave, electromagnetic and combinations of these.

28. The system of claim 1 wherein sparging of a controlled flow of gas through the spent fluid maintains the concentration of the fluid by evaporation of a diluting fluid selected from the group consisting of solvent, liquid oxidant and water.

29. The system of claim 1 wherein any chemical oxidants is heated prior to injection into the fluid and is used to heat the fluid, control liquid evaporation, and accelerate the oxidation.

30. The system of claim 1 wherein a controlled flow of gas is sparged through the spent fluid to remove volatile acid halides from the spent fluid.

31. A process for the recycling of a spent fluid of a plating bath comprising the steps of providing a conduit from an electroplating bath to one or more oxidation units, said units comprising one or more controlled sources of energy and chemical oxidants, supplying said spent fluid to the oxidation unit, exposing the spent fluid to the one or more sources of energy and oxidant within the one or more oxidation units to form one or more oxidized organics so as to reduce one or more selected organic contaminants in the fluid as determined by a sensor, removing thermal energy, chemical oxidant, and oxidized organics from the fluid, and returning the spent fluid to the electroplating bath.

32. The process of claim 31 wherein the temperature of the spent fluid is in the range of 5–100°, ozone gas and hydrogen peroxide are provided as chemical oxidants, the concentration of ozone gas is between 3 and about 30 percent by weight, the concentration of hydrogen peroxide is between about 0.5 and about 10% by volume, a controlled source of energy provides UV light and the wavelength of the UV light is in the range of between about 200 and about 800 nanometers.

* * * * *